3,738,909
MAGNESIUM HYDROXIDE-CONTAINING PAPER
John Maskal, Ivan M. Thompson, and Henrik R. Heikel, Ludington, Mich., assignors to The Dow Chemical Company, Midland, Mich.
No Drawing. Original application Nov. 4, 1968, Ser. No. 773,350, now Patent No. 3,639,158. Divided and this application May 17, 1971, Ser. No. 144,248
Int. Cl. D21h *3/66*
U.S. Cl. 162—181 A         1 Claim

ABSTRACT OF THE DISCLOSURE

Paper possessing outstanding opacity, whiteness and gloss characteristics containing a magnesium hydroxide pigment having about 1 to 5 weight percent calcium ion concentration in solid solution therewith and methods of manufacturing such paper are provided. The pigment is contained either as a paper filler or as a component of a coating pigment composition.

---

This application is a division of Ser. No. 773,350, filed Nov. 4, 1968, now U.S. Pat. No. 3,639,158.

BACKGROUND OF THE INVENTION

In paper manufacture, pigments and fillers, e.g. clays, calcium carbonate, titanium dioxide, are applied to the paper to increase the brightness and opacity. The main function of fillers is to fill the interstices between the fibers in the paper so that an opaque surface is obtained upon calendering the treated paper. Pigments give paper additional features such as smoothness and brightness. The industry has long sought a filler or pigment which has properties superior to clay or calcium carbonate but yet is less expensive than $TiO_2$.

Therefore, a primary object of the present invention is to provide a new relatively inexpensive pigment composition possessing superior opacifying power, high whiteness and high gloss characteristics for use, for example, in coating paper.

A further object of the present invention is to provide paper having superior opacity, whiteness and gloss properties.

Another object of the present invention is to provide a novel, improved filled paper.

Still another object of the present invention is to provide a novel, improved coated paper.

Another object of the present invention is to provide improved methods of making a superior paper product.

THE INVENTION

The above and other objects and advantages are obtained in a novel paper containing a special form of magnesium hydroxide pigment having about 1 to 5 weight percent calcium ion concentration in solid solution. Such paper is characterized by excellent opacity, high whiteness and in the coated form, high gloss.

The paper of the present invention can be of either the chemical grade fiber or groundwood type, filled and/or coated. When the paper is filled, the magnesium hydroxide pigment is present as a filler material. When the paper is coated, the magnesium hydroxide pigment can be present as a filler material and/or a pigment component of a coating pigment composition.

The term "solid solution," as used herein, refers both to calcium atoms taking up position in the $Mg(OH)_2$ lattice structure and an extremely fine, e.g. on the order of 500 A. particle size, physical mixture of $Mg(OH)_2$ and calcium values, usually $Ca(OH)_2$, achieved by coprecipitation. This is contrasted with a conventional mechanically achieved, physical mixture, e.g. about 10,000 A. particle size, which does not produce the desired results when used as a paper pigment.

The special form of magnesium hydroxide pigment employed in the paper of the present invention contains about 1 to 5 weight percent of calcium ions in solid solution. The magnesium hydroxide is further characterized as having an expanded lattice structure, apparently due to the calcium present. This is exemplified by conventional hexagonal lattice dimension constants, ($a$ and $c$): $a=3.162$ A.; $c=4.777$ A. In contrast, lattice constants for conventional, i.e. non-calcium containing, magnesium hydroxide have values of the order of: $a=3.147$ A.; $c=4.769$ A.

The magnesium hydroxide pigment can be prepared by processing dolomite in the following manner. Crushed magnesium and calcium carbonate containing material, e.g., dolomite, is calcined and the resulting product, commonly referred to as dolime, slaked to form $Ca(OH)_2$ and $Mg(OH)_2$. The slaked dolime is reacted with a $CaCl_2$ solution to form large calcium oxychloride crystals. The $Mg(OH)_2$ formed, which may be separated from the larger oxychloride crystals and $CaCl_2$ solution and dried, has about 1 to 5 percent calcium in solid solution either in the $Mg(OH)_2$ lattice and/or as a coprecipitate. Because of the resulting dislocation in its lattice structure, this material is sometimes referred to herein as "expanded" magnesium hydroxide.

The expanded magnesium hydroxide can also be prepared by calcining a dolomitic limestone to the oxides of magnesium and calcium, slaking at least the calcium oxide component in water to the corresponding hydroxide, carbonating only the calcium portion thereof to the carbonate, slaking any remaining magnesium oxide in water to the corresponding hydroxide, to form a calcium carbonate-expanded magnesium hydroxide slurry product. The $Mg(OH)_2$ can then be separated from the product. Alternatively the product is used as such as a filler composition, or as a pigment component in a coating composition by admixing with a binder material.

The paper of the present invention containing magnesium hydroxide is manufactured in a conventional manner known to those skilled in the paper art. For example, the wood is first pulped and bleached to form an aqueous suspension of cellulose fibers which is then processed through beaters. During the beating operation the pulp can be filled or loaded, sized and colored. The pulp is then formed into paper sheet, pressed and dried. The paper can then be converted, such as by coating with a paper pigment composition.

It has been discovered that the use of the magnesium hydroxide pigment hereinbefore described as a paper filler and/or as a coating pigment composition component produces a superior paper product with respect to opacity and whiteness.

When the magnesium hydroxide pigment is employed as a paper filler, it can be admixed with the pulp fibers in dry or pre-dispersed state, with or without the aid of a dispersing agent, e.g. polyphosphates, sodium lignosulfonate. It can be used alone or in connection with other fillers, e.g. clay, calcium sulfate, titanium dioxide, barium sulfate, calcium carbonate, talc and zinc sulfide. The amount of filler conventionally ranges from about 2 to 40 weight percent based on pulp fiber weight. Due to the magnesium hydroxide pigments' solubility in acids, it is preferably used in systems operating at at least a pH of 6 and more preferably in neutral or alkaline systems.

A further embodiment of the present invention is a novel coating pigment composition containing the magnesium hydroxide pigment hereinbefore described, at least one binder material, and optionally other pigments. Conventional proportions are used. For example useful coating compositions are obtained by thoroughly mixing from about 10 to about 25 parts by weight binder per 100 parts of pigment. Such a composition when used as a coating pigment for paper produces a paper product which has excellent opacity, whiteness and high gloss.

The term "binder material," as used herein, refers to those materials known for use in connection with paper pigments, which aid in binding the pigment particles together and, in turn, binding the coating to the paper surface. Such materials include, for example, casein, soybean proteins, alpha proteins, starches (dextrins, oxidized starches, enzyme - converted starches, hydroxylated starches), animal glue, polyvinyl alcohol, rubber latices, styrene-butadiene latex, and synthetic polymeric resin emulsions such as derived from acrylic and vinyl acetates.

In addition to the binder material and the magnesium hydroxide, the coating composition of the present invention can also contain other pigments, e.g. clay (hydrated aluminosilicates), calcium carbonate, titanium dioxide, aluminum oxide hydrate, satin white, and calcium sulfates. Preferably, the particle size of the magnesium hydroxide pigment and optional components used (if any) should not exceed about 10 microns in the longest dimension and preferably should be less than about 2 microns.

The coating pigment composition can be applied in a conventional manner known to those skilled in the paper art. For example, an aqueous dispersion of magnesium hydroxide pigment is admixed with an aqueous dispersion of binder material and the resultant coating, e.g. from about 30 to 60 weight percent solids, applied on the paper web by a blade or roll coater employing machine coating or off machine coating. Alternatively the expanded $Mg(OH)_2$ can be admixed with the binder and the composite added to water to form an aqueous dispersion which is then applied to the dryed paper web.

Whiteness and opacifying power of the present novel coating pigment composition relative to conventional pigments can be determined by use of conventional apparatus. For example, a Bausch and Lomb spectrophotometer or a Photovolt reflectometer (with a blue Wratten filter, 457 m$\mu$) can be employed for comparing the reflectance of the dry test specimen relative to a standard dry MgO specimen which is considered to have a 100 percent reflectance. The opacifying power of the pigment composition may be estimated by the Mitton-Jacobsen method, whereby a coating is cast on a black glass panel with a Bird doctor blade at a thickness of about one mil. A 5 sq. in. area of this slightly translucent film is measured for reflectance, $R_B$, and likewise the reflectance Roo of a thick layer over white glass. These readings are then converted by means of published graphs (Official Digest, vol. 35, September 1963, No. 464) into values of scattering power, the measured area of the coating is then removed from the black glass and weighed, thus enabling expression of the scattering coefficient, SC, in terms of an accurately known coating weight unit (lbs. per TAPPI ream).

The following examples serve to further illustrate the present invention and provide various operable and preferred embodiments thereof, but are not to be construed as limiting the invention thereto.

EXAMPLE 1

A sample of the expanded magnesium hydroxide, prepared by oxychloride method as described hereinabove, having about 4 weight percent calcium in solid solution, was admixed with an equal amount of clay and 15 parts by weight (based on the weight of the total pigmentation) binder material of styrene-butadiene latex to form a pigment composition within the present invention.

An A.E.G. focusing camera was used to determine the characteristic hexagonal lattice spacings ($a$ and $c$) for the $Mg(OH)_2$ employed: $a=3.162$ A.; $c=4.777$ A. X-ray measurements were used to determine the $Mg(OH)_2$ crystallite size corresponding to certain characteristic lattice planes (Miller indices):

| Lattice plane: | Measurements, A. |
| --- | --- |
| 001 | 500±150 |
| 101 | 500±100 |
| 110 | 360±100 |

The Mitton-Jacobsen method as previously described was used to determine the pigment's opacifying power. The scattering coefficient, SC, was 0.244.

EXAMPLE 2

Another example of the present pigment composition was prepared by admixing 25 parts of the expanded magnesium hydroxide, 25 parts of commercial grade $CaCO_3$, 50 parts clay and 15 parts styrene-butadiene latex binder. SC for this composition within the present invention was 0.213.

For comparison, commercial grade precipitated $CaCO_3$ and clay, both conventional paper pigments, were mixed equally with 15 parts by weight binder material of styrene-butadiene latex. The scattering coefficient was only 0.166, which is well below the results obtained for the above pigment compositions of the instant invention.

EXAMPLE 3

A pigment composition of the invention was prepared by the partial carbonation process hereinbefore described and comparatively tested against other pigment compositions and $Mg(OH)_2$ compositions for scattering coefficient. Table I presents the results.

TABLE I

| Pigment | Composition [a] | SC |
| --- | --- | --- |
| Invention—Ex. 3 | Expanded $Mg(OH)_2$ [b] | 0.196 |
| Comparative: | | |
| A | $CaCO_3$ | 0.147 |
| B | Clay | 0.136 |
| C | Conventional $Mg(OH)_2$ [c] | 0.120 |
| D | do | 0.096 |

[a] The composition being 75 parts clay, 15 parts by weight styrene-butadiene binder (based on weight of pigment) and 25 parts of the listed pigment material.
[b] Had the same lattice constants as the $Mg(OH)_2$ of Examples 1 and 2.
[c] Comparative Example C had lattice constants of $a=3.147$ A. and $c=4.769$ A. and crystallite size measurements of:

| Lattice plane | Measurement, A. |
| --- | --- |
| 001 | 570 |
| 101 | 720 |
| 110 | 1,040 |

As shown in the table, the composition of the present invention has increased opacifying power over conventional pigments and other $Mg(OH)_2$ compositions.

EXAMPLE 4

Various coating compositions were applied to a base stock of bleached sulphite paper having a basis weight of 61 g./m.$^2$. The coating weight was about 15 g./m.$^2$. Each coated paper was tested for opacity (TAPPI) and whiteness. Table II presents the results.

TABLE II

| Coating | Composition [1] | Opacity | Whiteness |
| --- | --- | --- | --- |
| Comparative: | | | |
| E | Uncoated | 79.7 | 79.5 |
| F | 100 parts clay | 88.4 | 78.0 |
| G | 75 parts clay; 25 parts precipitated; $CaCO_3$. | 89.4 | 81.6 |
| Invention, Ex. 4 | 75 parts clay; 25 parts expanded; $Mg(OH)_2$. | 91.2 | 84.3 |

[1] Balance being 15 parts styrene-butadiene latex binder.

As the data demonstrates, the paper of the present invention has higher opacity and whiteness than the paper coated with conventional clay or calcium carbonate pigments.

EXAMPLE 5

Filled paper sheets were prepared on Noble-Wood handsheet machine from bleached soft wood pulp processed at pH of 7.0 using various filler materials. The sheets were tested for opacity (TAPPI) and whiteness.

Table III shows the average of the results obtained.

| Filler | Composition[1] | Opacity | Whiteness |
|---|---|---|---|
| Comparative: | | | |
| H | Unfilled | 63.5 | 84.3 |
| I | Clay (5%) | 71.0 | 84.5 |
| J | Precipitated CaCO₃ (5%) | 76.1 | 87.3 |
| Invention, Ex. 5 | Expanded Mg(OH)₂ (5%) | 80.6 | 88.8 |
| Comparative K | TiO₂ (5%) | 83.9 | 90.7 |

[1] Actual amount of filler retained.

The filled paper of the present invention possesses superior opacity and whiteness over the clay and $CaCO_3$ filled papers. Although the expanded $Mg(OH)_2$ filled paper is not quite equal in brightness and opacity with $TiO_2$ filled paper, the $Mg(OH)_2$ paper is more favorable economically.

The present invention may be modified or changed without departing from the spirit or scope thereof.

What is claimed is:

1. A paper containing a magnesium hydroxide pigment as a filler, said pigment being characterized as having from about 1 to about 5 weight percent calcium ion concentration in solid solution.

References Cited
UNITED STATES PATENTS

| | | | |
|---|---|---|---|
| 1,415,391 | 5/1922 | Rafsky | 106—306 |
| 1,598,104 | 8/1926 | Rafsky | 106—306 |
| 3,197,322 | 7/1965 | Maskal et al. | 106—306 |

S. LEON BASHORE, Primary Examiner

F. FREI, Assistant Examiner

U.S. Cl. X.R.

162—181 R